June 8, 1965  W. M. SHIVE ETAL  3,188,012
IMPELLER DESIGNS FOR FOOD WASTE DISPOSER
Filed Feb. 4, 1963
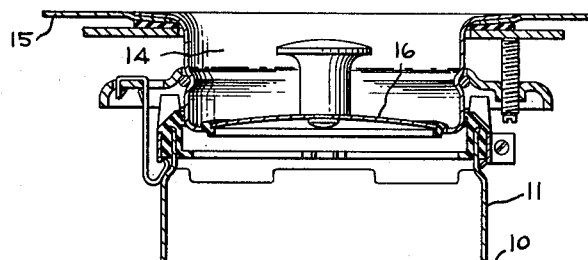
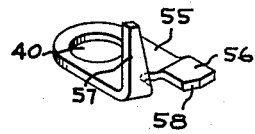
FIG. 4
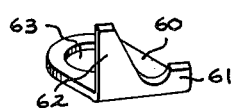
FIG. 5
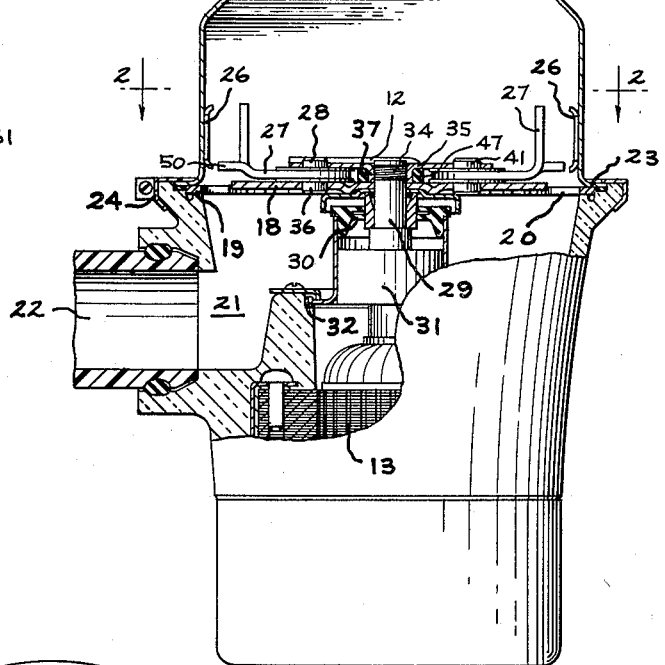
FIG. 6
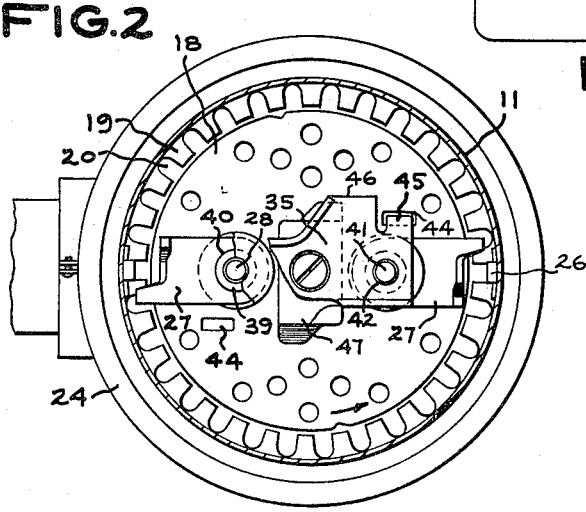
FIG. 2
FIG. 1
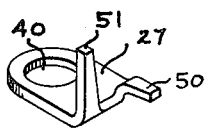
FIG. 3
INVENTORS
WILLIAM M. SHIVE
& FRANCIS J. CLEMENTS
BY
Richard L. Caslin
THEIR ATTORNEY

United States Patent Office 3,188,012
Patented June 8, 1965

3,188,012
IMPELLER DESIGNS FOR FOOD WASTE
DISPOSER
William M. Shive and Francis J. Clements, Louisville, Ky.,
assignors to General Electric Company, a corporation
of New York
Filed Feb. 4, 1963, Ser. No. 255,782
8 Claims. (Cl. 241—188)

The present invention relates to the art of food waste disposers and primarily to an improved type of impeller means for use therein for comminuting food waste particles to produce a flowable mixture in the presence of water for discharging into the drain system leading from the kitchen sink.

A conventional food waste disposer includes a vertically extending cylindrical hopper means having a top access opening for receiving water and food waste material therethrough. The hopper means is adapted to be suspended below the drain opening of a kitchen sink. Rotatable comminuting means is disposed in the bottom of the hopper, and an electrically driven power means is provided below the comminuting means and operatively joined thereto for driving the comminuting means. A suitable drain line is connected to a sump located beneath the comminuting means for carrying off the water-entrained food waste into the sewer system provided for the home.

A suitable comminuting assembly includes a circular flywheel and a waste impeller means mounted on the top surface of the flywheel. Preferably, the waste impeller means comprises at least one swinging impeller and usually two that are oppositely disposed on the top surface of the flywheel and pivotally fastened thereto to swing in a generally horizontal plane about a vertical axis that is substantially parallel to the pivotal axis of the flywheel in a hammer mill fashion.

Recently there has been a trend toward the adoption of high speed series motors in place of the relatively low speed induction motors that have been used for powering the disposer for many years. The particular series motor being used has a speed of not less than 6,000 r.p.m. and as much as 15,000 r.p.m. under no-load conditions, and this high speed influences the whole philosophy that governs the design of the disposer. A single phase induction motor is a constant speed motor while the series A.C. motor is a variable speed machine with low speeds for large loads and high speeds for light loads. The starting torque of a series motor is also very high. As a general rule, series motors are never used where the load is intermittent, where the load changes frequently or is put on or taken off while the motor is running. The present invention is an exception to this general rule because of the particular nature of the comminuting assembly and particularly the pivoted impeller means.

The principal object of the present invention is to provide a food waste disposer with a pivoted impeller means that will have a high grinding performance and exert a small load on the motor as is indicated by a low current reading when operating the comminuting means immersed in water being fed into the disposer hopper from a kitchen sink.

A further object of the present invention is to provide an impeller means for a food waste disposer where the impeller is formed of sheet metal stock and has a low silhouette especially at the distal end and a relatively high silhouette inwardly thereof for cutting soft foods.

A still further object of the present invention is to provide an impeller means of the class described with a raised low silhouette at the distal end adjacent the leading edge thereof and a high silhouette inwardly of the distal end adjacent the trailing edge, thereby having a small frontal area at the most active portion of the impeller and a larger frontal area at a less active portion of the impeller as measured from the pivotal axis thereof.

The present invention, in accordance with one form thereof, relates to a swinging impeller design for a food waste disposer where the impeller is formed of sheet metal stock that has one end that is adapted to be pivoted to the flywheel of a disposer. The distal end of the impeller which is the most active portion thereof is formed with a tab with a low silhouette adjacent the leading edge of the impeller, while there is a generally vertical cutting portion inwardly of the distal end and adjacent the trailing edge of the impeller that has a relatively high silhouette.

Our invention will be better understood from the following description taken in conjunction with the accompanying drawing and its scope will be pointed out in the appended claims.

FIGURE 1 is a vertical cross-sectional view of a food waste disposer embodying one modification of impeller of the present invention;

FIGURE 2 is a cross-sectional plan view of the comminuting assembly of the disposer taken on the line 2—2 of FIGURE 1 for a better understanding of the swinging impeller means;

FIGURE 3 is an isometric view of one of the swinging impellers of the comminuting assembly of FIGURE 1;

FIGURE 4 is an isometric view similar to that of FIGURE 3 of a second modification of swinging impeller;

FIGURE 5 is a third modification of swinging impeller also shown in isometric view; and FIGURE 6 is a fourth modification of impeller means according to the present invention.

Referring in detail to the drawing and in particular to FIGURE 1, there is shown a detailed illustration of a typical food waste disposer 10 in which the present invention could be used to advantage. This disposer comprises three main parts; namely, a cylindrical hopper 11, a rotatable comminuting means 12 located adjacent the bottom of the hopper, and a vertically-disposed motor 13 located beneath the comminuting means and operatively connected thereto.

The upper end of the hopper 11 is designed to be suspended from the drain opening or sink flange 14 of a typical kitchen sink 15 or the like. Any suitable suspension means may be employed for this purpose, as for example the one which is illustrated; namely, the design disclosed and claimed by Johnny W. Yartz and Francis J. Clements in U.S. Patent 3,108,755, issued October 29, 1963, and assigned to the General Electric Company, the same assignee as in the present invention. Since this particular suspension means does not form part of the present invention it will not be discussed here in detail. A simple stopper 16 is positioned within the sink flange 14 to serve as a stopper or plug for the sink when it is desired to fill the sink with water. This stopper is easily removable for the loading of food waste into the hopper 11 and for passage of water into the hopper continuously during the comminuting operation.

The bottom of the disposer hopper 11 terminates adjacent the mid-height of the disposer. Within this lower area of the hopper there is shown a comminuting assembly 12 that includes a circular flywheel 18 and a metering ring 19 that lies in substantially the same plane as the flywheel but is slightly depressed therefrom. This metering ring 19 is best illustrated in FIGURE 2 and it is shown as having a plurality of radial slots or notches 20 formed completely around the ring and open to the inner periphery of said ring. These radial slots 20 serve as axial discharge openings so that all comminuted food waste passes in a vertical direction from the comminuting chamber at the lower end of the hopper into a sump 21 that is located directly beneath the comminuting assembly. A drain opening 22 is formed in one side of the sump 21 for making connection with the sewer system that is joined to the house. It will be recognized that the hopper 11 is shown as a thin sheet metal hopper having an outwardly turned flange 23 at its lower end, while the sump 21 is formed as an upward extension of the housing of the motor 13. The metering ring 19 is of thin flat plate construction and it is sandwiched between the said hopper flange and the sump housing, and the entire assembly is held together by a clamping ring 24 which completes the assembly of the main portions of the disposer.

Returning to the comminuting assembly 12, a pair of grinding pads 26 are welded to opposite sides of the hopper adjacent the lower end thereof. The circular flywheel 18 is provided with a waste impeller means comprising a pair of diametrically opposed swinging impellers 27. Each impeller 27 is pivotally connected to the flywheel as at 28 about a substantially vertical axis which is parallel to the axis of rotation of the flywheel that is defined by the drive shaft 29 of a high speed series motor 13 operating between 6,000 and about 15,000 r.p.m.

To digress briefly, suitable water sealing means 30 are provided around the shaft bearing 31 as well as at 32 to prevent water from passing from the sump 21 into the housing of the motor 13 as is well understood in this art. For a more detailed explanation of such sealing means attention is directed to U.S. Patent 3,112,077 issued to Johnny W. Yartz on November 26, 1963, which is assigned to the same assignee as the present invention. The center of the flywheel 18 is provided with a close-fitting opening that slips over the top of the shaft 29. The top portion of the shaft is threaded as at 34 to receive a threaded retainer member 35 that serves both as a nut to fasten the flywheel to the shaft and as a means to capture a pivot pin 36 as at 28 on the top surface of the flywheel and provide means for pivoting each impeller 27 to the flywheel. The retainer member 35 is a sheet metal part that has a central down-turned collar 37 with internal threads for engaging the external threads 34 of the shaft. The flywheel is provided with a pair of diametrically opposed circular openings for receiving the lower portion of each pivot pin 36. The central portion of the pivot pin is enlarged as at 39 (best seen in FIGURE 2) to serve as the bearing for the opening 40 in the pivoted end of the impeller 27. The upper portion 41 of the pivot pin is of lesser diameter than the central portion and similar to the lower portion of the pin for engagement in a mating opening 42 in the retainer.

Accordingly, impeller 27 is fastened to the flywheel 18 by first placing a metal washer over the pin-receiving opening in the flywheel. Next, the pivot pin 36 is inserted through the washer and into the opening. Then the impeller 27 is placed over the bearing 40 of the pivot pin and a second washer is assembled onto the pivot pin and over the impeller. Finally, the retainer 35 is assembled onto the pivot pins and over the impellers with the openings 42 fitted over the upper portions of the pivot pins. The flywheel is also provided with a pair of diametrically opposite openings 44 as best seen in FIGURE 2. The purpose of these openings is to receive a tongue portion 45 that extends from an edge of the retainer 35 down through the opening 44 in the flywheel and is bent over so that the pivot pins 36 are captured between the flywheel and the retainer.

Finally, the flywheel is assembled to the shaft by taking the subassembly of the flywheel 18, retainer 35, pivot pins 36 and impellers 27 and threading this subassembly onto the upper end of the motor shaft 29 until the flywheel assumes the position shown in FIGURE 1. This flywheel is adapted to turn in a counterclockwise direction and the leading edge 46 of the retainer is formed downwardly to present an inclined ramp as best seen in FIGURE 2 so that food particles will not become lodged thereunder. Moreover, a large rubber block 47 is located around the collar 37 of the retainer and it extends outwardly beyond the confines of the retainer to serve as a resilient stop means for both swinging impellers 27 in the event the impeller strikes an immovable object and swings backwardly in a direction opposite the direction of rotation of the flywheel.

Turning to a consideration of FIGURE 3 there is shown an isometric view of the swinging impeller 27 illustrated in the assembly views of FIGURES 1 and 2. One of the most distinctive features of the various modifications of impellers of the present invention is that they are formed of thin metal stock and have a distal end of low silhouette formed so as not to completely overlie the drain openings 20, for this tends to increase the load on the motor by reducing the speed of draining of the water into the sump and builds up a larger head of water thereby tending to overload and overheat the motor during operation. In other words, there is a compromise made here; namely, of extending the distal end of the impeller slightly over the discharge openings 20 in the metering ring although not completely covering the openings, otherwise the impellers would build up the load on the motor and cause it to overheat and actuate the motor overload protector.

The preferred impeller modification of FIGURE 3 is shown as made of sheet metal stock with a bifurcated distal end formed by a relatively short tab 50 at the leading edge and a longer tab 51 at the trailing edge. The short tab 50 is raised slightly as is best seen in FIGURE 1 while it remains in a generally horizontal plane. This raised feature improves the efficiency of the grinding action by increasing the clearance between the tab 50 and the drain openings 20 in the metering ring 19.

The second tab 51 is a tab that is longer than the first tab 50 and it is set back from the distal end of the impeller a slight amount and it extends generally vertically from the flywheel adjacent the trailing edge of the impeller. Accordingly, the distal end of the impeller is provided with a raised low silhouette adjacent the leading edge of the impeller and a generally vertical cutting portion set back from the distal end and adjacent the trailing edge of the impeller. The opposite end of the impeller is the pivotal end and it includes the circular opening 40 which is adapted to slip over the bearing portion 39 of the pivot pin 36 as was mentioned previously.

In the second modification of FIGURE 4, the impeller is identified as element 55 with the usual opening 40 at its pivoted end and a bifurcated portion at the distal end comprising a low silhouette tab 56 and a high silhouette tab or cutting portion 57. Both of these tabs 56 and 57 are wider than the similar parts 50 and 51 of impeller 27. Moreover, the high silhouette tab 57 is folded at its base at an oblique angle with respect to the longitudinal axis of the impeller to be at about 70° with respect thereto. Also, the lower tab 56 has an edge 58 that is trimmed off to be generally parallel with the outermost plane of the high silhouette tab 57.

The third modification of FIGURE 5 has the impeller identified as element 60 where the distal end is bifurcated and both the short tab 61 and the longer tab 62 are folded up at an oblique angle of about 60° with respect to the longitudinal axis of the impeller so that both tabs 61 and 62 lie within a common vertical plane. Also, the opening 63 at the pivoted end.

The fourth modification of FIGURE 6 is a casting 65 of thin metal stock such as silicon bronze having a low silhouette tab 66 at the distal end and a relatively high silhouette tab 67 of thin cross-section stepped back from the distal end. The tab 67 has a streamlined frontal edge 68 that is inclined backwardly from the lower leading edge to the upper trailing edge as is clearly illustrated. Moreover, it has the typical pivoted end defined by the circular opening 69.

Modifications of this invention will occur to those skilled in this art, therefore, it is to be understood, that this invention is not limited to the particular embodiments disclosed, but that it is intended to cover all modifications which are within the true spirit and scope of this invention as claimed.

What we claim as new and desire to secure by Letters Patent of the United States is:

1. In a food waste disposer having a stationary hopper enclosing a comminuting chamber, a rotatable comminuting assembly including a circular flywheel and a waste impeller means mounted on the top surface of said flywheel, the flywheel having a vertical axis of rotation and forming a bottom wall of said comminuting chamber, a drainage chamber disposed beneath said flywheel for receiving water and comminuted waste material from said hopper and a series of vertical drainage openings arranged just outside the periphery of the flywheel; the invention comprising a waste impeller means in the form of a pair of oppositely disposed swinging impellers, each impeller being of thin metal flat sheet stock and having a pivoted end that turns about a substantially vertical axis and a distal end with a low silhouette that is adapted to extend beyond the periphery of the flywheel and overlie only a portion of the drainage openings as the flywheel turns, and a generally vertical cutting portion, the entire vertical cutting portion being stepped back toward the pivoted end from the distal end for cutting soft foods.

2. In a food waste disposer as recited in claim 1 wherein each impeller is of sheet metal stock and has one end that is adapted to pivot from the flywheel about a substantially vertical axis, the other end of the impeller being the distal end with a slightly raised tab of low silhouette at the leading edge and a generally vertical cutting portion at the trailing edge spaced inwardly a slight amount from the distal end.

3. A pivoted impeller for a waste disposal apparatus where the impeller is made of thin metal flat stock and has a pivoted end that turns about an axis that is generally perpendicular to the plane of the main body of the impeller, the distal end of the impeller being a continuation of the main body with a low silhouette, and a generally vertical cutting portion, the entire vertical cutting portion being stepped back toward the pivoted end from the distal end for cutting soft foods.

4. In a food waste disposer having a stationary hopper enclosing at its bottom portion a comminuting chamber, a rotatable comminuting assembly including a circular flywheel and a waste impeller means mounted on the top surface of said flywheel, the flywheel having a vertical axis of rotation and forming a bottom wall of said hopper, a drainage chamber disposed beneath said flywheel for receiving water and comminuted waste material from said hopper, drainage openings outside the confines of the flywheel for passing the water and waste from the hopper to the sump, and a high speed motor connected to the flywheel for rotation between 6,000 and 15,000 r.p.m., the invention comprising a swinging impeller of thin flat metal stock where one end is adapted to be pivotally connected on the top surface of the flywheel, the opposite end of the impeller being bifurcated to present a short tab of low silhouette on the leading edge of the impeller and a long tab of high silhouette on the trailing edge.

5. A swinging impeller as recited in claim 4 wherein the bifurcation is formed by a central longitudinal slot where both entire tabs are folded vertically from the main portion of the impeller, while the short tab is formed down horizontally so as to be raised above the plane of the main portion of the impeller to create a greater clearance between the short tab and the drainage openings as the impellers sweep over said openings.

6. A swinging impeller as recited in claim 4 wherein the bifurcation is formed by a central longitudinal slot where the long tab is folded vertically from the main portion of the impeller and is in a plane that is arranged at an acute angle with respect to the longitudinal axis of the impeller, the short tab being formed upwardly and then horizontally to create a greater clearance between the short tab and the drainage openings.

7. A swinging impeller as recited in claim 4 wherein the bifurcation is formed by a central longitudinal slot where both entire tabs are folded vertically into a single plane that is arranged at an acute angle with respect to the longitudinal axis of the impeller.

8. In a food waste disposer having a stationary hopper enclosing a comminuting chamber, a rotatable comminuting assembly including a circular flywheel and a waste impeller means mounted on the top surface of said flywheel, the flywheel having a vertical axis of rotation and forming a bottom wall of said comminuting chamber, a drainage chamber disposed beneath said flywheel for receiving water and comminuted waste material from said hopper and a series of vertical drainage openings arranged just outside the periphery of the flywheel; the invention comprising a waste impeller means in the form of a pair of oppositely disposed swinging impellers, each impeller being formed of thin sheet metal stock and having one end adapted to pivot from the flywheel about a substantially vertical axis, the other end of the impeller being the distal end and being bifurcated to form a relatively short tab and a longer tab, the short tab being formed upwardly into a raised generally horizontal low silhouette portion, while the longer tab is formed at a generally vertical angle as a cutting portion that is spaced inwardly from the distal end a slight amount.

References Cited by the Examiner
UNITED STATES PATENTS

| | | | |
|---|---|---|---|
| 2,293,668 | 8/42 | Shankel | 241—195 |
| 2,852,200 | 9/58 | Holzer. | |
| 2,980,348 | 4/61 | Jordan. | |
| 3,005,596 | 10/61 | Jenkins | 241—46 |
| 3,076,611 | 2/63 | Jordan. | |

J. SPENCER OVERHOLSER, *Primary Examiner.*